(12) United States Patent
Martinson (10) Patent No.: US 7,540,116 B1
(45) Date of Patent: Jun. 2, 2009

(54) TRIM AND SEAL ASSEMBLIES FOR VEHICLE WITH SLIDE OUT ROOM AND METHOD OF MANUFACTURE

(75) Inventor: Daniel J. Martinson, Plymouth, MN (US)

(73) Assignee: Lifetime Industries, Inc., Rogers, MN (US)

( * ) Notice: Subject to any disclaimer, the term of this patent is extended or adjusted under 35 U.S.C. 154(b) by 400 days.

(21) Appl. No.: 11/286,703

(22) Filed: Nov. 23, 2005

Related U.S. Application Data (60) Provisional application No. 60/630,722, filed on Nov. 24, 2004.

(51) Int. Cl.
*E04B 1/346* (2006.01)
*E04B 7/16* (2006.01)

(52) U.S. Cl. ............................ 52/67; 277/644; 277/645; 277/921; 296/26.13; 296/165

(58) Field of Classification Search ............... 52/67, 52/79.1, 79.5, 143; 296/26.01, 26.09, 26.13, 296/165, 171, 175, 26.12, 172, 173, 176; 277/644, 645, 648, 921, 651; 49/475.1, 484.1, 49/493.1, 495.1, 496.1, 498.1
See application file for complete search history.

(56) References Cited

U.S. PATENT DOCUMENTS

| | | | |
|---|---|---|---|
| 5,894,698 A | | 4/1999 | Dewald |
| 6,048,016 A | * | 4/2000 | Futrell et al. ............. 296/26.13 |
| 6,572,170 B2 | | 6/2003 | McManus |
| 6,966,590 B1 | * | 11/2005 | Ksiezopolki et al. ..... 296/26.01 |

\* cited by examiner

*Primary Examiner*—Brian E. Glessner
*Assistant Examiner*—Christopher J Darner
(74) *Attorney, Agent, or Firm*—Botkin & Hall, LLP (57) ABSTRACT

A mobile structure, such as a recreational vehicle, that includes a wall having first and second opposed surfaces and an edge surface. The edge surface defines an opening through the wall. A slide-out room or other enclosure is moveably located in the opening. A trim member having an integral seal is attached at the opening and the seal is engageable with a flange on the enclosure. A second trim member has an integrally attached flexible member projecting outwardly therefrom. The flexible member engages the enclosure and wipes moisture and debris from the enclosure as it is moved into a retracted position with the mobile structure. The two trim members have an overlapping portion with the opening and can be simultaneously secured to the wall by driving a mechanical fastener through the overlapped portions of the trim members. A method of manufacturing such mobile structures is also provided.

17 Claims, 4 Drawing Sheets

TRIM AND SEAL ASSEMBLIES FOR VEHICLE WITH SLIDE OUT ROOM AND METHOD OF MANUFACTURE

CROSS-REFERENCE TO RELATED APPLICATION

This application claims the benefit of Provisional Application Ser. No. 60/630,722, filed Nov. 24, 2004, the disclosure of which is incorporated by reference.

BACKGROUND OF THE INVENTION

1. Field of the Invention

The present invention relates to recreational vehicles with slide out rooms and, more particularly, to the trim assemblies and sealing members used with such slide out rooms.

2. Description of the Related Art

To permit their transport over the public highway system, recreational vehicles and other forms of mobile living quarters have a limited width. When such vehicles are parked, however, their width is no longer limited and it becomes desirable to enlarge the useable space within the vehicle. As a result, it has become common to equip such vehicles with "slide-out" rooms that can be withdrawn into the vehicle during transport over the public highway system and extended to provide additional living space when the vehicle is stationary.

The use of such a slide-out room requires an opening in a wall of the vehicle in which the slide-out room is located. The joint between the slide-out room and the vehicle wall must be adequately sealed to prevent the entry of water and small debris into the interior of the vehicle. Slide-out room openings have been provided with a variety of sealing members to prevent the ingress of water and debris. These sealing members generally perform adequately immediately following their installation but are subject to loosening and, over time, will oftentimes separate from the surface on which they are attached and fail to provide an adequate seal.

An improved structure that provides a long-lived and rugged sealing assembly for a slide-out room is desirable.

SUMMARY OF THE INVENTION

The present invention provides trim and seal assemblies that can be used with the slide-out room of a recreational vehicle and other similar mobile living quarters. The trim and seal assemblies of the present invention provide a rugged and reliable method for sealing the opening between the mobile structure and slide-out room and can be efficiently installed.

The invention comprises, in one form thereof, a mobile structure having an interior space. The mobile structure includes an exterior wall having first and second opposed major surfaces and an edge surface extending between the first and second major surfaces. The edge surface defines an opening through the wall and an enclosure is disposed within the opening. The enclosure is moveable between a retracted position wherein the enclosure is located substantially within the mobile structure and an extended position wherein the enclosure projects outwardly from the wall and increases the interior space of the mobile structure. A flange extends outwardly from the enclosure and is positioned adjacent the first major surface of the wall by movement of the enclosure. A trim member is provided and includes a substantially L-shaped base portion with first and second legs. The first leg overlays the first major surface of the wall. The second leg is secured to the wall and disposed within the opening overlaying the edge surface. The trim member further includes a seal member disposed on the first leg and integrally formed with the first leg. The seal member is positioned to engage the flange and form a seal between the first major surface and the flange when the flange is positioned adjacent the first major surface.

The invention comprises, in another form thereof, a mobile structure having an interior space. The mobile structure includes an exterior wall having first and second major surfaces and an edge surface extending between the first and second major surfaces. The edge surface defines an opening through the wall and an enclosure is disposed within the opening. The enclosure is moveable between a retracted position wherein the enclosure is located substantially within the mobile structure and an extended position wherein the enclosure projects outwardly from the wall and increases the interior space of the mobile structure. The enclosure includes at least one panel disposed proximate a portion of the edge surface. A trim member is provided and has an L-shaped base portion with first and second legs. The trim member further includes a flexible member integrally joined with the base portion with a free end extending outwardly therefrom. The trim member is secured to the wall with the first leg overlaying the second major surface of the wall. The second leg is disposed within the opening and overlays the edge surface. The flexible member extends outwardly from the second leg within the opening and engages the panel. The flexible member wipes moisture and debris from the panel during movement of the enclosure from the extended position to the retracted position.

The invention comprises, in still another form thereof, a mobile structure having an interior space. The mobile structure includes a wall having interior and exterior opposed major surfaces and an edge surface extending between the interior and exterior major surfaces. The edge surface defines an opening through the wall and an enclosure is disposed within the opening. The enclosure is moveable between a retracted position wherein the enclosure is located substantially within the mobile structure and an extended postion wherein the enclosure projects outwardly from the wall and increases the interior space of the mobile structure. An interior flange extends outwardly from the enclosure and is located within the mobile structure. The interior flange is positioned adjacent the interior major surface when the enclosure is disposed in the extended position. An interior trim member is provided and has a substantially L-shaped base portion with a first leg overlaying the interior major surface adjacent the opening and a second leg disposed within the opening and overlaying the edge surface. The interior trim member further includes a seal member disposed on the first leg. The seal member is engaged with the interior flange when the enclosure is in the extended position. An exterior trim member is also provided and includes a substantially L-shaped base portion with a first leg overlaying the exterior major surface adjacent the opening and a second leg disposed within the opening and overlaying the edge surface. The exterior trim member further includes a flexible member extending from the second leg of the exterior trim member and which is wipingly engaged with the enclosure. The second leg of the interior trim member and the second leg of the exterior trim member define an overlapped portion wherein one of the second legs overlays the other second leg. The interior trim member and the exterior trim member are secured to the wall with a plurality of mechanical fasteners that extend through the overlapped portion of the interior trim member and the exterior trim member.

The invention comprises, in another form thereof, a method of manufacturing a mobile structure having an interior space. The method includes providing a mobile structure with an exterior wall wherein the wall includes first and second opposed major surfaces and an edge surface extending between the first and second major surfaces and wherein the edge surface defines an opening through the wall. An enclosure is moveably disposed in the opening and has a retracted position wherein the enclosure is located substantially within the mobile structure and an extended position wherein the enclosure projects outwardly from the wall and increases interior space of the mobile structure. The enclosure also includes an outwardly extending flange that is positionable adjacent the first major surface of the wall by movement of the enclosure. A trim member is formed by coextrusion and includes a substantially L-shaped base portion extruded of a first material and a seal member extruded of a second material. The base portion includes a first leg and a second leg and the seal member is disposed on the first leg. The method also includes installing the trim member with the second leg disposed in the opening and overlaying the edge surface and the first leg overlaying the first major surface with the seal member positioned to engage the flange when the enclosure is in the extended position.

The invention comprises, in yet another form thereof, a method of manufacturing a mobile structure having an interior space. The method includes providing a mobile structure having an exterior wall. The wall includes first and second opposed major surfaces and an edge surface extending between the first and second major surfaces wherein the edge surface defines an opening through the wall. An enclosure is moveably disposed in the opening and has a retracted position wherein the enclosure is located substantially within the mobile structure and an extended position wherein the enclosure projects outwardly from the wall and increases the interior space of the mobile structure. A trim member having a substantially L-shaped base portion with a first leg and a second leg and a flexible member extending outwardly from the second leg is formed by coextruding the flexible member with at least a portion of the L-shaped base portion. The method also includes installing the trim member with the second leg disposed in the opening and overlaying the edge surface and the first leg overlaying the second major surface. When installed, the flexible member is engaged with the enclosure and wipes moisture and debris from the enclosure as the enclosure is moved from the extended position to the retracted position.

The invention comprises, in still another form thereof, a method of manufacturing a mobile structure having an interior space. The method includes providing a mobile structure having a wall wherein the wall includes interior and exterior major surfaces and an edge surface extending between the interior and exterior major surfaces. The edge surface defines an opening through the wall and an enclosure is moveably disposed in the opening. The enclosure has a retracted position wherein the enclosure is located substantially within the mobile structure and an extended position wherein the enclosure projects outwardly from the wall and increases the interior space of the mobile structure. The enclosure also includes an interior flange extending outwardly from the enclosure and positioned adjacent the interior major surface of the wall when the enclosure is in the extended position. An interior trim member and an exterior trim member are provided. The interior trim member has a substantially L-shaped base portion with a first leg and a second leg and a seal member disposed on its first leg. The exterior trim member has a substantially L-shaped base portion with a first leg and a second leg and a flexible member extending from its second leg. During installation the interior trim member is positioned so that the first leg of the interior trim member overlays the interior major surface and its seal member is engageable with the interior flange when the enclosure is in the extended position and with the second leg of the interior trim member being disposed in the opening and overlaying the edge surface. The exterior trim member is positioned during installation with its first leg overlaying the exterior major surface and its second leg disposed in the opening and overlaying the edge surface with the flexible member wipingly engaged with the enclosure. A portion of the second legs of the interior trim member and the exterior trim member are overlapped and the interior trim member and the exterior trim member are secured to the wall with a plurality of mechanical fasteners that extend through the overlapped portions of the second legs of the interior and exterior trim members.

An advantage of the present invention is that by providing a seal member integrally formed with a trim member, the seal member is more reliably attached to the trim member and will have an extended life.

Another advantage is that by providing a flexible projection integrally formed with a trim member, the flexible projection can be used to wipe moisture and debris from the slide-out room and have an extended life.

Yet another advantage is that by providing an interior trim member and an exterior trim member have an overlapped portion, both of the trim members can be simultaneously secured to the wall by driving a mechanical fastener through the overlapped portions of the trim members.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

Figure 1:
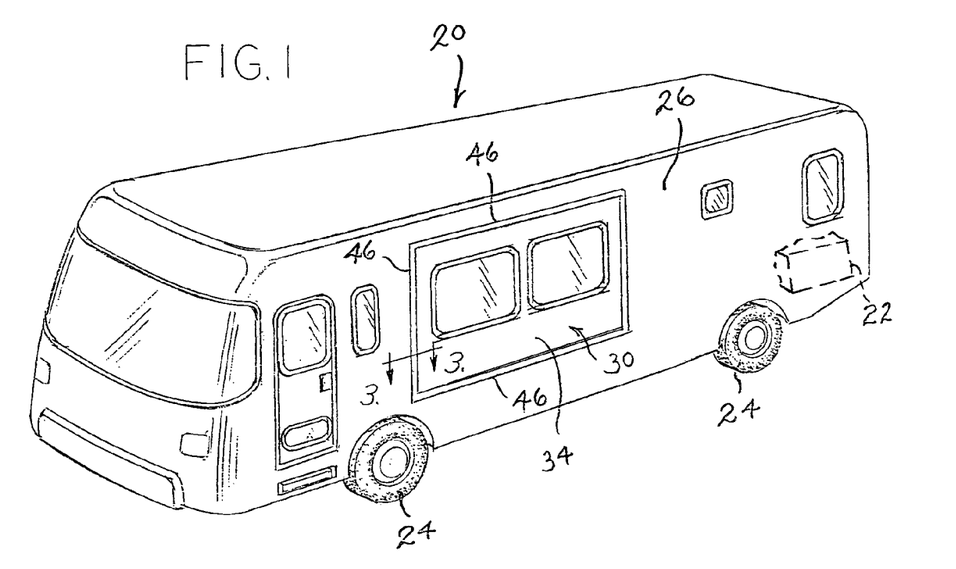
FIG. 1 is a perspective view of a mobile structure with a slide-out room in a retracted position.
Figure 2:
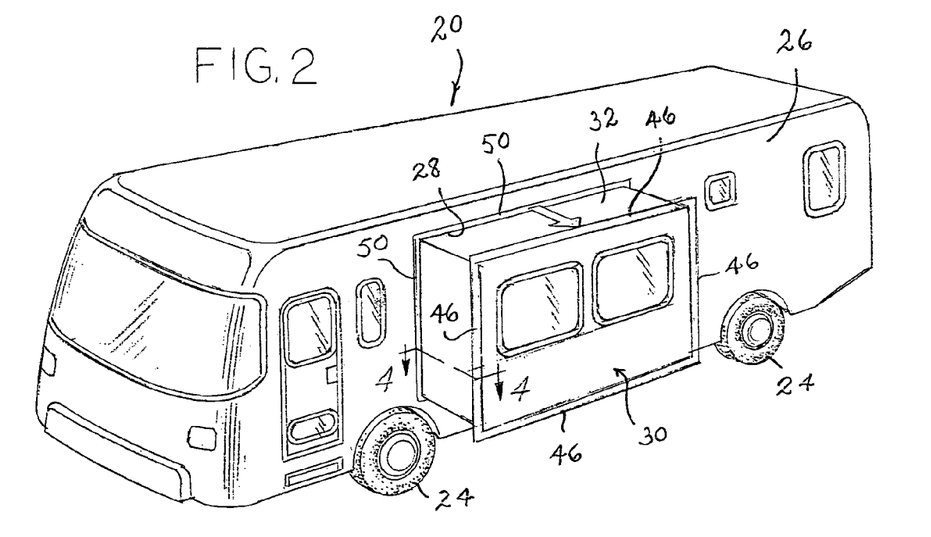
FIG. 2 is a view of the mobile structure of FIG. 1 with the slide-out room in an extended position.

A mobile structure 20 in accordance with the present invention is shown in FIGS. 1 and 2. In the illustrated embodiment, the mobile structure 20 is a recreational vehicle having an internal combustion engine 22 and wheels 24 whereby vehicle 20 is self-powered and can be driven over the public roadway system. As also seen in FIGS. 1 and 2, vehicle 20 has an exterior wall 26 with an opening 28 in which an enclosure 30 is located. Enclosure 30 is a slide-out room and is moveable between the retracted position shown in FIG. 1 and the extended position shown in FIG. 2. When slide-out room 30 is retracted into vehicle 20 in the position shown in FIG. 1, vehicle 20 has a width that permits it to be driven over the public roadway system. When vehicle 20 is parked, slide-out room 30 can be extended into the position shown in FIG. 2 to increase the usable interior space within vehicle 20.

Enclosure 30 is defined by four perimeter panels 32 and an exterior panel 34. Perimeter panels 32 include a floor panel, two sidewall panels and a roof panel. Exterior panel 34 closes off one end of panels 32. The opposite, interior end 36 of panels 32 is open to the interior of vehicle 20 and includes an outwardly extending flange 38 along its perimeter. Enclosure 30 has a construction similar to that of a conventional slide-out room. Panel 34 has a plywood substrate with aluminum sheeting on its exterior surface. Similarly, panels 32 have plywood substrates with aluminum or polymeric sheeting on their exterior surfaces. The interior of panels 32, 34 may be covered with a fabric or other material suitable for the interior of a recreational vehicle.

Figure 3:
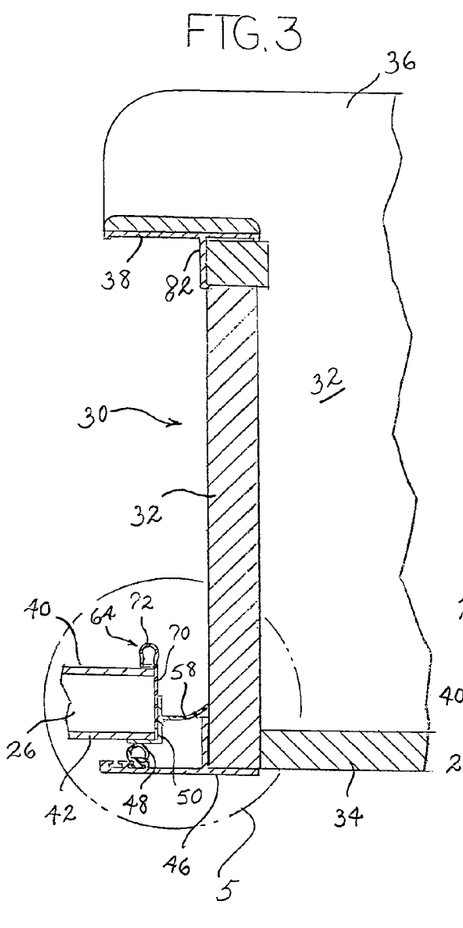
FIG. 3 is a cross sectional view with the slide-out room in its retracted position taken along line 3-3 of FIG. 1.
Figure 4:
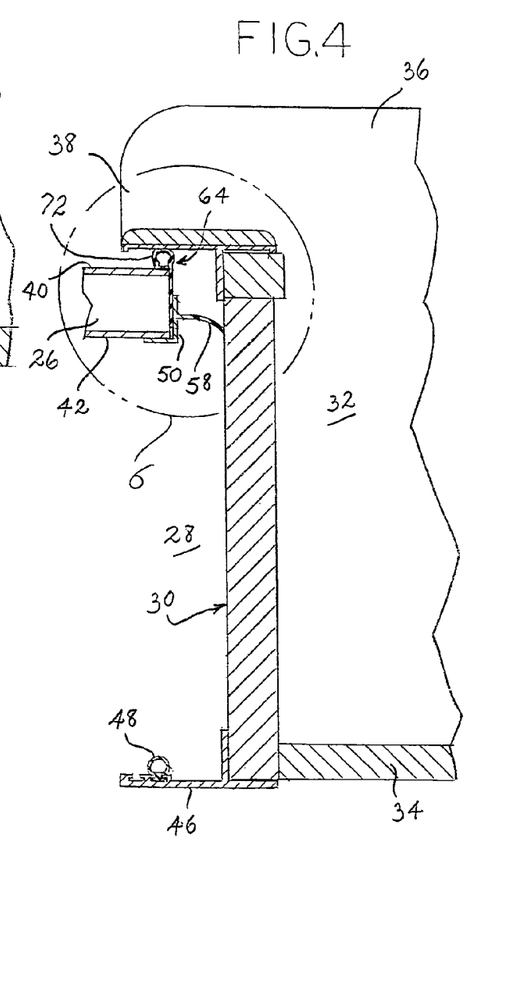
FIG. 4 is a cross sectional view with the slide-out room in its extended position taken along line 4-4 of FIG. 2.

Exterior wall 26 of vehicle 20 has a first major surface 40 that faces the interior of vehicle 20 and an opposite second major surface 42 that forms an exterior surface of vehicle 20. An edge surface 44 (FIGS. 5 and 6) extends between interior and exterior surfaces 40, 42 and defines opening 28 in which enclosure 30 is located. The relationship of wall 26 with enclosure 30 is shown in FIGS. 3 and 4 which provide a cross sectional view of one of the side perimeter panels 32 and the trim assemblies secured to wall 26 at opening 28. Cross sections through the upper (or roof) perimeter panel 32 and lower (or floor) perimeter panel 32 would be substantially similar to the cross sections shown in FIGS. 3 and 4 whereby the trim assemblies shown in FIGS. 3 and 4 substantially circumscribe the entirety of rectilinear opening 28.

Figure 5:
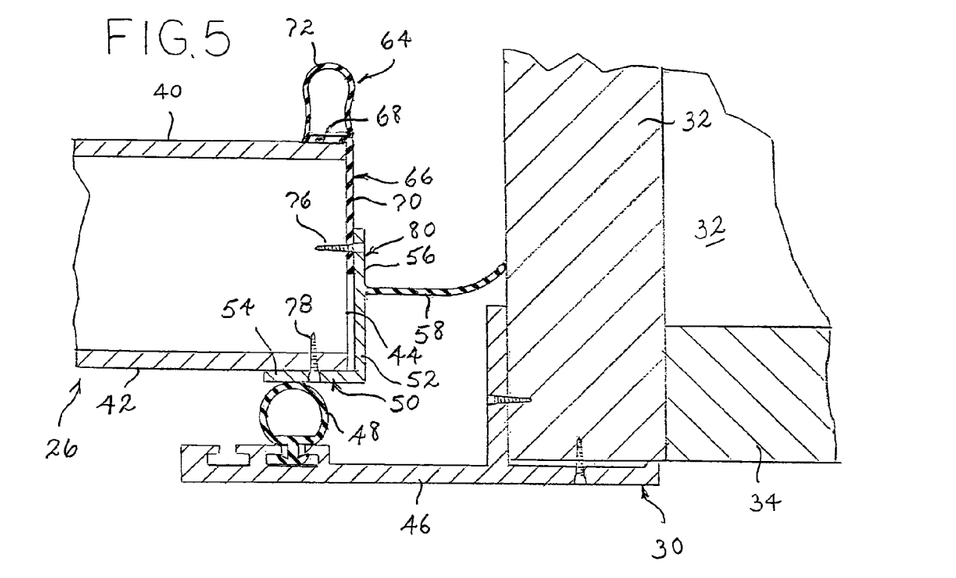
FIG. 5 is a detail view of FIG. 3.

As seen in FIG. 3, and in greater detail in FIG. 5, when enclosure 30 is in its retracted position located substantially within vehicle 20, an outer flange 46 located on enclosure 30 and formed of an aluminum extrusion is positioned near exterior surface 42. Outer flange 46 has a seal member 48 mounted thereon to engage trim member 50 and thereby seal opening 28 when enclosure 30 is retracted.

Figure 8:
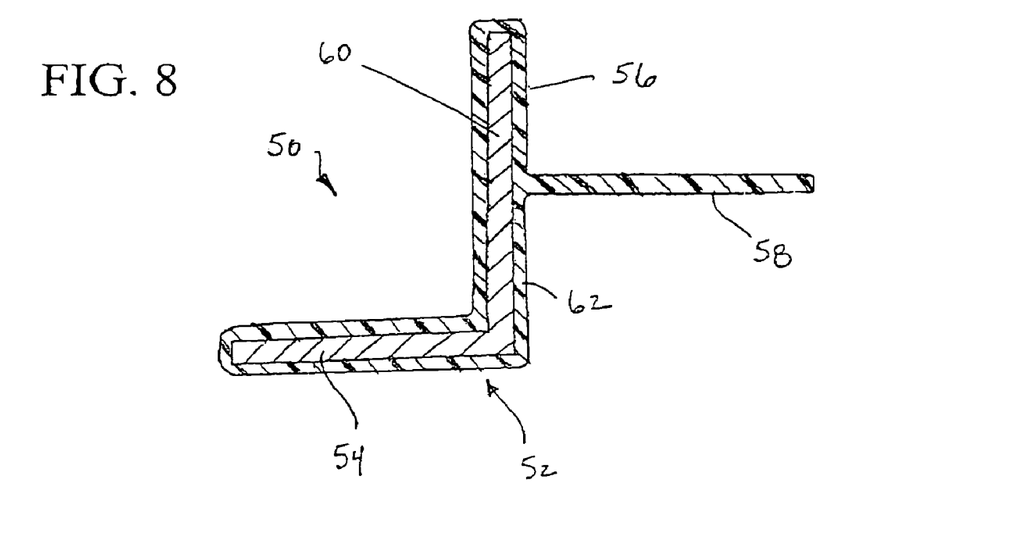
FIG. 8 is a cross sectional view of the exterior trim and wiper member.

Trim member 50 includes has an L-shaped base portion 52 with a first leg 54 and a second leg 56. Trim member 50 also includes a flexible member 58 extending outwardly from second leg 56. As can be seen in FIG. 8, base portion 52 of exterior trim member 50 has an L-shaped metallic substrate 60 that has a polymeric coating 62 with flexible member 58 being integrally formed with polymeric coating 62. In the illustrated embodiment, substrate 60 is a roll-formed aluminum. After forming substrate 60, coating 62 and flexible member 58 are coextruded over substrate 60 to form exterior trim member 50. Coating 62 is a 20% talc filled polypropylene and flexible member 58 is a thermoplastic olefin or thermoplastic elastomer. Alternative materials may also be employed with the present invention.

As best seen in FIGS. 3-6, flexible member 58 extends outwardly with its distal free end being deflected by and engaging an adjacent panel 32. Flexible member 58 thereby functions as a wiper, removing moisture and small debris from the engaged panel 32 when enclosure 30 is moved between the positions shown in FIGS. 3 and 4. This is most valuable when enclosure 30 has been in an extended position for a period of time, for example, vehicle 20 may remain parked for several days, and the exterior surface of panels 32 have been exposed to the external environment. In such a situation moisture and debris, such as dew and leaf clutter, may collect on panels 32. As enclosure 30 is retracted to enable the transport of vehicle 20, wiper 58 will remove a significant quantity, if not all, of the moisture and debris on panels 32.

Another trim member 64 is located on the opposite side of opening 28. Interior trim member 64 includes a substantially L-shaped base portion 66 having first and second legs 68, 70 and a seal member 72 integrally formed on first leg 68. Trim member 64 is a coextrusion with base portion 66 being a semi-rigid thermoplastic elastomer and bulb compression seal member 72 being a less rigid thermoplastic elastomer. For example, base portion 66 may be formed with Sarlink 4190 commercially available from Koninklijke DSM N.V. of the Netherlands and seal member 72 may be formed with C-Flex® 35 commercially available from Consolidated Polymer Technologies, Inc. of Clearwater, Fla. Other suitable materials may also be employed to form trim member 64.

Figure 7:
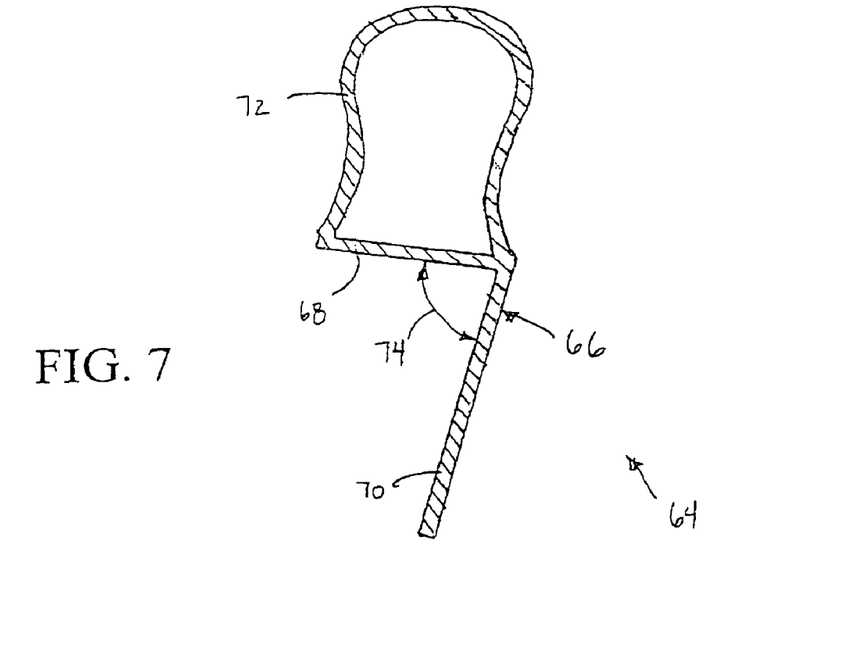
FIG. 7 is a cross sectional view of the interior trim and seal member.

FIG. 7 illustrates interior trim member 64 prior to its installation on wall 26. As shown, legs 68, 70 of trim member 64 define an acute angle 74 prior to installation. This configuration allows trim member 64 to be secured to wall 26 solely with mechanical fasteners extending through second leg 70. To install trim member 64, it is fitted to the right angle corner formed by interior surface 40 and edge surface 44. When second leg 70 is secured to wall 26 by driving a mechanical fastener 76 through second leg 70 and edge surface 44, first leg 68 is firmly biased against interior surface 40 because its engagement with interior surface 40 has biased legs 68, 70 into a configuration forming a substantially 90 degree angle.

Figure 6:
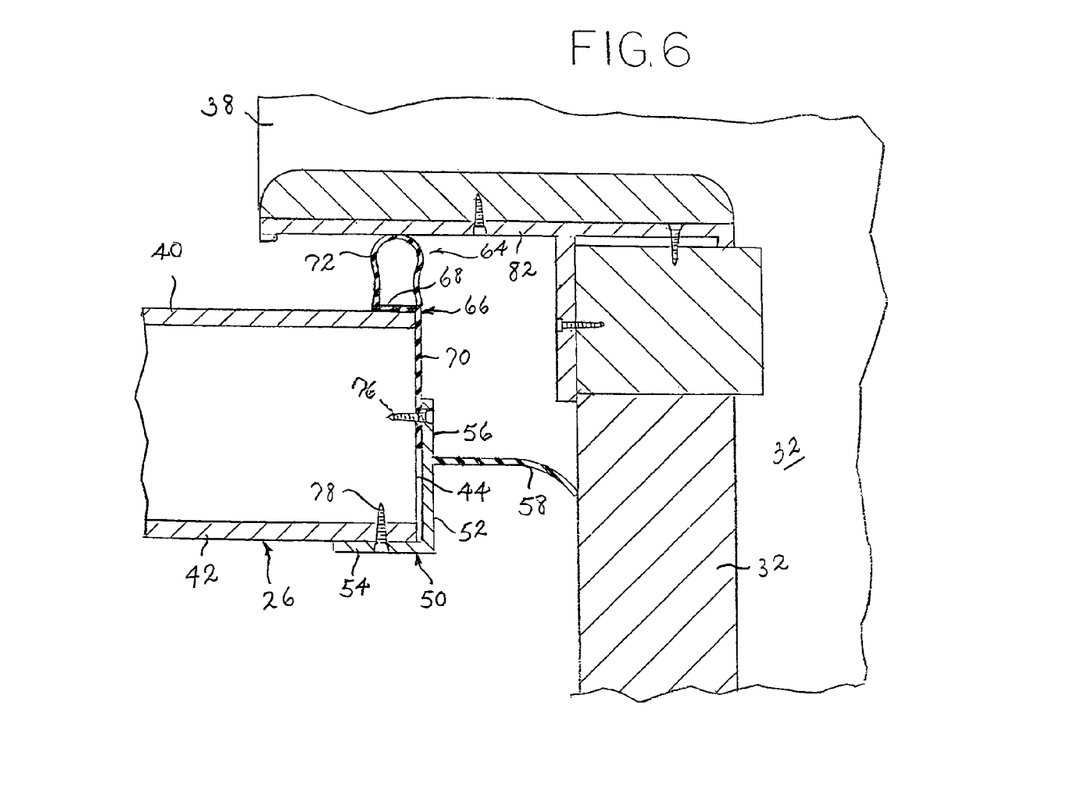
FIG. 6 is a detail view of FIG. 4.

As shown in FIGS. 3-6, first leg 68 of installed trim member 64 overlays interior surface 40 while second leg 70 overlays edge surface 44. A T-shaped aluminum extrusion 82 is located at the joint between panels 32 and interior flange 38 on enclosure 30 and forms that portion of interior flange 38 which is positioned adjacent to interior surface 40 when enclosure 30 is in its extended position. As best seen in FIGS. 4 and 6, seal member 72 located on first leg 68 is positioned adjacent opening 28 and engages T-shaped aluminum extrusion 82 to seal opening 28 when enclosure is in the extended position.

Exterior trim member 50 is fitted to the right angle corner formed by exterior surface 42 and edge surface 44 with two sets of mechanical fasteners. First leg 54 of trim member 50 overlays exterior surface 42 and fasteners 78 are extended through first leg 54 and exterior surface 42 to anchor leg 54 to wall 26. Second leg 56 of trim member 50 is located within opening 28 and overlays edge surface 44. As best seen in FIGS. 5 and 6, a portion of the distal ends of second legs 70, 56 of trim members 64, 50 overlay one another and define an overlapped region 80. Fasteners 76 extend through these overlapped portions 80 to thereby simultaneously secure both trim members 50 and 64.

In the illustrated embodiment, trim member 50 has spaced apart openings (not shown) that are preformed in legs 54 and 56 to facilitate attachment with fasteners 76, 78. Trim member 64, however, does not include such preformed holes and fasteners 76 are driving through leg 70 during the installation process. Fasteners 76, 78 are threaded fasteners in the illustrated embodiment, however, nails, staples and other suitable fastening means may also be employed.

While adhesives may be used to attach either or both trim members 50, 64, it is more advantageous to use mechanical fasteners such as screws, nails or staples. For example, the illustrated embodiment has an opening 28 that is fully trimmed and provided with sealing members 48, 72 and a wiper 58 without using any adhesive attachments. This is do both to the mechanical attachment of trim members 50, 64 to wall 26 as well as the integral attachment of seal 72 to trim member 64 and the integral attachment of wiper 58 to trim member 50. When adhesives are used to attach such trim, sealing or wiping members, the adhesive bond is often the location of the initial failure of the trim and seal assembly. Thus, by avoiding the use of such adhesives the illustrated embodiment provides a trim and seal assembly with an enhanced durability.

Furthermore, by having trim members 50, 64 partially overlap within opening 28, the number of trim parts can be kept to a minimum. The efficiency of the installation process is also increased because both trim pieces can be simultaneously secured by using fasteners that extend through the overlapped portion 80 of trim members 50, 64. Although second leg 56 of exterior trim member 50 overlays second leg 70 of interior trim member 64 in the illustrated embodiment, the interior trim member can overlay the exterior trim member in alternative embodiments.

While this invention has been described as having an exemplary design, the present invention may be further modified within the spirit and scope of this disclosure. This application is therefore intended to cover any variations, uses, or adaptations of the invention using its general principles.

What is claimed is:

1. A mobile structure having an interior space, said mobile structure comprising:
    an exterior wall, said wall including a first major surface defining an interior surface of said mobile structure and a second opposed major surface defining an exterior surface and an edge surface extending between said first and second major surfaces, said edge surface defining an opening through said wall;
    an enclosure disposed within said opening and moveable between a retracted position wherein said enclosure is located substantially within said mobile structure and an extended position wherein said enclosure projects outwardly from said wall, said enclosure increasing the interior space of said mobile structure when in said extended position:
    a flange extending outwardly from said enclosure and positionable adjacent said first major surface of said wall by movement of said enclosure;
    an interior trim member, said interior trim member including a substantially L-shaped base portion with first and second legs, said second leg secured to said wall and disposed within said opening overlaying said edge surface, said first leg overlaying said first major surface of said wall, said interior trim member further including a seal member disposed on said first leg and integrally formed with said first leg, said seal member positioned to engage said flange and form a seal between said first major surface and said flange when said flange is positioned adjacent said first major surface; and
    an exterior trim having a substantially L-shaped second base portion, said exterior trim member having one leg overlaying said second major surface of said wall and another leg disposed within said opening and overlaying a portion of said edge surface and a portion of said second leg of said interior trim member having mechanical fasteners extending through said exterior trim member and second leg of said interior trim member whereby said mechanical fasteners simultaneously secure said interior trim member and said exterior trim member.

2. A mobile structure having an interior space, said mobile structure comprising:
    a wall including interior and exterior opposed major surfaces and an edge surface extending between said interior and exterior major surfaces, said edge surface defining an opening through said wall;
    an enclosure disposed within said opening and moveable between a retracted position wherein said enclosure is located substantially within said mobile structure and an extended position wherein said enclosure projects outwardly from said wall, said enclosure increasing the interior space of said mobile structure when in said extended position;
    an interior flange extending outwardly from said enclosure and located within said mobile structure; said interior flange positionable adjacent said interior major surface when said enclosure is disposed in said extended position;
    an interior trim member having a substantially L-shaped base portion with a first leg overlaying said interior major surface adjacent said opening and a second leg disposed within said opening and overlaying said edge surface, said interior trim member further including a seal member disposed on said first leg and engageable with said interior flange when said enclosure is in said extended position;
    an exterior trim member having a substantially L-shaped base portion with a first leg overlaying said exterior major surface adjacent said opening and a second leg disposed within said opening and overlaying said edge surface, said exterior trim member further including a flexible member extending from said second leg of said exterior trim member and wipingly engageable with said enclosure; and
    wherein said second leg of said interior trim member and said second leg of said exterior trim member define an overlapped portion wherein one of said second legs overlays the other second leg and wherein said interior trim member and said exterior trim member are secured to said wall with a plurality of mechanical fasteners extending through said overlapped portion of said interior trim member and said exterior trim member.

3. The mobile structure of claim 2 wherein said seal member is integrally formed with said interior trim member.

4. The mobile structure of claim 2 wherein said flexible member is integrally formed with said exterior trim member.

5. The mobile structure of claim 2 comprising a plurality of said interior trim members and a plurality of said exterior trim members and wherein said interior and exterior trim members substantially circumscribe said opening and cover substantially all of said edge surface.

6. The mobile structure of claim 2 wherein, prior to attachment of said interior trim member to said wall, said first and second legs of said interior trim member define an acute angle therebetween and attachment of said second leg of said interior trim member to said wall disposed said first and second legs of said interior trim member at a substantially right angle thereby biasing said first leg of said interior trim member into firm engagement with said interior major surface of said wall.

7. The mobile structure of claim 2 wherein said interior trim member and said exterior trim member are secured to said wall solely by said mechanical fasteners extending through said overlapped portion.

8. The mobile structure of claim 2 further comprising an internal combustion engine operably mounted on said mobile structure whereby said mobile structure is self-propelled.

9. A mobile structure having an interior space, said mobile structure comprising:
   an exterior wall, said wall including a first major surface defining an interior surface of said mobile structure and a second opposed major surfaces defining an exterior surface and an edge surface extending between said first and second major surfaces, said edge surface defining an opening through said wall;
   an enclosure disposed within said opening and moveable between a retracted position wherein said enclosure is located substantially within said mobile structure and an extended position wherein said enclosure projects outwardly from said wall, said enclosure increasing the interior space of said mobile structure when in said extended position:
   a flange extending outwardly from said enclosure and positionable adjacent said first major surface of said wall by movement of said enclosure; and
   an interior trim member, said interior trim member including a substantially L-shaped base portion with first and second legs, said second leg secured to said wall and disposed within said opening overlaying said edge surface, said first leg overlaying said first major surface of said wall, said interior trim member further including a seal member disposed on said first leg and integrally formed with said first leg, said seal member positioned to engage said flange and form a seal between said first major surface and said flange when said flange is positioned adjacent said first major surface; and
   an exterior trim having a substantially L-shaped second base portion, said exterior trim member having one leg overlaying said second major surface of said wall and another leg disposed within said opening and overlaying a portion of said edge surface and a portion of said second leg of said interior trim member having mechanical fasteners extending through said exterior trim member and said second leg of said interior trim member whereby said mechanical fasteners simultaneously secure said interior trim member and said exterior trim member.

10. The mobile structure of claim 9, wherein said exterior trim member is secured to said wall solely by said mechanical fasteners extending through said exterior trim member and said second leg of said interior trim member.

11. The mobile structure of claim 9, wherein said exterior trim member further comprises a flexible projection extending therefrom, said flexible projection being engaged with said enclosure wherein said flexible projection wipes moisture and debris from said enclosure as said enclosure is moved from said extended position to said retracted position.

12. A mobile structure having an interior space, said mobile structure comprising:
   an exterior wall, said wall including first and second major surfaces and an edge surface extending between said first and second major surfaces, said edge surface defining an opening through said wall;
   an enclosure disposed within said opening and moveable between a retracted position wherein said enclosure is located substantially within said mobile structure and an extended position wherein said enclosure projects outwardly from said wall, said enclosure increasing the interior space of said mobile structure when in said extended position, said enclosure including at least one panel disposed proximate a portion of said edge surface;
   a trim member having an L-shaped base portion with first and second legs, said L-shaped base portion including an L-shaped metallic substrate and a polymeric coating substantially covering said substrate, said trim member further including a flexible member integrally joined with said base portion and having a free end extending outwardly therefrom, said trim member being secured to said wall with said first leg overlaying said second major surface of said wall, said second leg being disposed within said opening and overlaying said edge surface; said flexible member extending outwardly from said second leg within said opening and engaging said panel wherein said flexible member wipes moisture and debris from said panel during movement of said enclosure from said extended position to said retracted position.

13. The mobile structure of claim 12, wherein said substrate comprises aluminum, said coating comprises polypropylene and said flexible member comprises thermo plastic olefin.

14. The mobile structure of claim 12, wherein said second major surface is an exterior surface of said mobile structure and said trim member is an exterior trim member and wherein said mobile structure further comprises an interior trim member, said interior trim member including a substantially L-shaped base portion, said interior trim member having one leg disposed within said opening and overlaying said edge surface and another leg overlaying said first major surface and having an integral seal member extending therefrom, said enclosure including an interior flange engagable with said seal member when said enclosure is in said extended position, a portion of said second leg of said exterior trim member overlapping a portion of said interior trim member.

15. The mobile structure of claim 14, wherein said interior trim member and said exterior trim members are each secured to said wall with mechanical fasteners which extend through said overlapped portions of said second leg of said exterior trim member and said interior trim member.

16. The mobile structure of claim 15, wherein said interior trim member and said exterior trim member are attached to said wall solely by mechanical fasteners.

17. A mobile structure having an interior space, said mobile structure comprising:
   an exterior wall, said wall including a first major surface defining an interior surface, a second major surface defining an exterior surface, and an edge surface extending between said first and second major surfaces, said edge surface defining an opening through said wall;
   an enclosure disposed within said opening and moveable between a retracted position wherein said enclosure is located substantially within said mobile structure and an extended position wherein said enclosure projects outwardly from said wall, said enclosure increasing the interior space of said mobile structure when in said extended position, said enclosure including at least one panel disposed proximate a portion of said edge surface;
   a trim exterior member having an L-shaped base portion with first and second legs, said exterior trim member further including a flexible member integrally joined with said base portion and having a free end extending outwardly therefrom, said exterior trim member being secured to said wall with said first leg overlaying said second major surface of said wall, said second leg being disposed within said opening and overlaying said edge surface; said flexible member extending outwardly from said second leg within said opening and engaging said panel wherein said flexible member wipes moisture and debris from said panel during movement of said enclosure from said extended position to said retracted position; and an interior trim member including a substantially L-shaped base portion, said interior trim member having one leg disposed within said opening and overlaying said edge surface and another leg overlaying said first major surface and having an integral seal member extending therefrom, said enclosure including an interior flange engageable with said seal member when said enclosure is in said extended position, a portion of said second leg of said exterior trim member overlapping a portion of said interior trim member.

* * * * *